United States Patent Office 3,634,492
Patented Jan. 11, 1972

3,634,492
STABILIZED DERIVATIVES OF ASPIRIN
Alexander Galat, Yonkers, N.Y.
(1980 S. Ocean Drive, Hallandale, Fla. 33009)
No Drawing. Filed Aug. 22, 1968, Ser. No. 754,724
Int. Cl. C07c 69/14
U.S. Cl. 260—480                    4 Claims

ABSTRACT OF THE DISCLOSURE

Aspirin and aspirin derivatives, such as the alkali metal, alkaline earth metal, ammonium and magnesium salts thereof, decompose with more or less rapidity on storage, even at room temperature. By admixing aspirin or such aspirin derivatives with a small quantity (2–15%, preferably about 5%) of an anionic exchanger, compositions of matter result that exhibit outstanding storage stability at room temperatures.

---

Ever since the discovery of the valuable analgesic and antipyretic properties of acetylsalicylic acid (aspirin) some 60 years ago, continuous attempts have been made to prepare a stable, neutral, water soluble derivative of this compound. Such a derivative would offer a number of important advantages over aspirin itself—it could be given in solution form to patients unable to swallow tablets, it would be more readily absorbed and, most important, it would reduce the incidence of gastro-intestinal disorders resulting from the acidic nature and the low water solubility (1 g./100 ml.) of aspirin.

In attempts to prepare a stable, neutral, water soluble derivative of aspirin a very large number of salts and other derivatives of this compound have been synthesized: lithium, ammonium, sodium, potassium, calcium and magnesium salts, amine and amino acid salts, calcium salt complexes with urea, with amino acids and the like. Unfortunately, these compounds proved to be of unreliable stability on storage. Apparently neutralization of the carboxyl group of acetylsalicylic acid makes the acetyl group extraordinarily sensitive to hydrolysis and other types of decomposition and, as a result, many of these compounds rapidly decompose on storage with the formation of various breakdown products such as salicylic acid, acetic acid and others.

Equally troublesome is the fact that the storage behavior of these aspirin salts and other derivatives is extremely erratic and unpredictable. Different lots of such compounds, prepared by the same process, vary greatly in stability, some lots decomposing after several weeks storage, others after several months, while still others remain in apparently good condition for even longer periods only to begin to decompose suddenly and at a very rapid rate for no apparent reason. This unpredictable behavior undoubtedly explains in large measure the contradictory claims regarding the stability of salts and various other derivatives of aspirin made by various investigators in the past.

One object of this invention is to provide stable aspirin, and stable salts and dervatives thereof.

Another object of this invention is to provide stable, neutral, water soluble salts and derivatives of aspirin.

Additional objects of this invention will become apparent as the description thereof proceeds.

I have discovered that the objects of this invention are accomplished by incorporating minor amounts of an anion exchange material into aspirin, its salts and derivatives. Incorporation of from 2–15% by weight, preferably about 5% by weight of the anion exchanger into aspirin, aspirin salts and aspirin derivatives is sufficient to produce a composition of matter exhibiting an eminently satisfactory stability at room temperature.

It has long been known that the stability of aspirin and aspirin compounds is greatly affected by the presence of moisture. Accordingly, attempts have been made to counteract this effect by keeping the products protected from moisture and by admixing them with dehydrating agents. Among the latter may be mentioned, anhydrous glucose, anhydrous lactose, anhydrous calcium chloride, anhydrous magnesium chloride and the like. I have investigated, in addition, more modern dehydrating, adsorbing and adsorbing agents such as silica gel, various silicas (Syloids of Davison Chemical Co.; QUSO of Philadelphia Quartz Co.), magnesium silicates (Magnesol of Waverly Chemical Co.), pyrogenic silicas (Aerosil of Degussa, Inc.) and other similar commercial products. None of these dehydrating, absorbing and adsorbing agents had any influence in increasing the stability of aspirin compounds and, although difficult to explain, in many instances such agents actually lowered the stability of aspirin compounds as will be shown in the table presented post.

It has also been suspected that, in addition to moisture, free acidity has an influence on the stability of aspirin compounds. Accordingly, various neutralizing agents have been incorporated with aspirin compounds. Among these may be mentioned sodium bicarbonate, sodium carbonate, calcium carbonate and magnesium carbonate. It has been found that with these agents, too, the stability is often adversely affected (for example, with sodium bicarbonate and sodium carbonate), while with others no effect at all is observed. These statements will be illustrated in the previously mentioned table appearing subsequently herein. The dehydrating agents mentioned previously, in addition to being excellent dehydrating agents are also highly active in absorbing and adsorbing acids. However, as mentioned above, these agents, surprisingly, exhibit an adverse effect upon the stability of aspirin compounds.

The stability of aspirin compounds has frequently been measured in the past by an accelerated aging test in which five days at 50° C. or fourteen days at 37° C. were considered as being equivalent to one year storage at room temperature (approximately 20° C.). However, recent experience has shown that these accelerated tests are of limited value only. Thus, products that do not pass this stability test will definitely prove to be unstable at room temperature. However those products that do pass an accelerated test will not necessarily prove to be stable at room temperature. Accordingly, the only valid test for determining the room temperature stability of aspirin compounds is to keep them at room temperature and measure the resulting stability under such test conditions. Many conflicting results with aspirin compounds reported in the prior art are undoubtedly due in large measure to the described discrepancies in accelerated testing methods. Stability data given herein were all determined by the "room temperature method."

As mentioned above, the present invention is based on the discovery that aspirin and its compounds are stabilized against decomposition by the use of anionic exchange materials. This is an entirely new and unexpected result since anionic exchangers are very strong bases (in some instances as strong as sodium and potassium hydroxides) and it is well known that aspirin and its compounds are extremely sensitive to alkaline compounds. Thus aspirin itself which is the most stable of all the materials under consideration here, decomposes within two or three days at room temperature when mixed with sodium or potassium hydroxide or with such a mild alkali as sodium bicarbonate. Also illustrative of this sensitivity is the fact that it is impossible to prepare sodium or potassium salts of aspirin in the conventional manner by combining the acid with the alkali in aqueous solution. When this is attempted a complete breakdown of the aspirin molecule takes place almost instantly resulting in the formation of salicylates and acetates. Yet in contrast to these behavior patterns I have found that anionic exchangers, in spite of their very high alkalinity, not only do not cause any decomposition of aspirin, its salts and its derivatives but, surprisingly, effectively stabilizes these compounds against decomposition.

The striking stabilizing affect of these compounds can be most convincingly demonstrated using sodium acetylsalicylate which is an aspirin salt particularly unstable on storage. The following table shows the stabilizing effect of various additives on sodium acetylsalicylate. The additives were added to the salt in the amount of 5% by weight and the resulting compositions were kept for twelve months at room temperature in a closed vial.

PERCENT DECOMPOSITION OF SODIUM ACETYLSALICYLATE AFTER TWELVE MONTHS STORAGE AT ROOM TEMPERATURE

| | Lot No. 1 | Lot No. 2 | Lot No. |
|---|---|---|---|
| Additive (5% by wt. used): | | | |
| None | 2 | 8 | 30 |
| Silica gel | 12 | 25 | 50 |
| Syloid Al-1 (A) | 9 | 17 | 45 |
| QUSO F-22 (B) | 4 | 16 | 45 |
| Aerosil (C) | 7.5 | 15 | 45 |
| Sodium bicarbonate | 100 | 100 | 100 |
| Sodium carbonate | 100 | 100 | 100 |
| Sodium hydroxide | 100 | 100 | 100 |
| Calcium carbonate | 2 | 8-10 | 35 |
| Magnesium carbonate | 2 | 8-10 | 35 |
| Calcium hydroxide | 100 | 100 | 100 |
| Glucose, anhydrous | 2 | 8 | 30 |
| Lactose, anhydrous | 2 | 8 | 30 |
| Anionic exchangers: | | | |
| Dowex 1 (D) | 0 | 1 | 3.5 |
| Dowex 2 (D) | 0 | 1 | 3.5 |
| Dowex 3 (D) | 0 | 1 | 3.5 |
| Amberlite IRA-400 (E) | 0 | 1.5 | 4.0 |
| Amberlite IR-4b (E) | 0 | 1.5 | 4.0 |
| $Na_{86}(AlO_2)_{86}(SiO_2)_{106}$ (F) | 0 | 1 | 2.5 |
| $Na_{12}(AlO_2)_{12}(SiO_2)_{12}$ (F) | 0 | 1 | 2.5 |

Source Code: (A), Davison Chemical Co.; (B), Philadelphia Quartz Co.; (C), Degussa, Inc.; (D) Dow Chemical Co.; (E) Rohm and Hass; (F) crystalline zeolites from Union Carbide Corporation.

Data in the foregoing table, in addition to demonstrating the remarkable stabilzing effect of anionic exchangers towards sodium acetylsalicylate, also demonstrate many other statements made previously herein. For example, it will be observed that the three different lots of sodium aspirin employed in conducting these tests differed quite widely in storage stability when held for one year at room temperature in the absence of any additive. Also, the extremely deleterious effect of ordinary alkaline materials, even extremely weak alkalies such as sodium bicarbonate, on the storage stability of aspirin in the form of its sodium salt is evident.

As will be seen from this table an excellent stabilizing effect was achieved with all inorganic anionic exchangers (also known as crystalline zeolites or molecular sieves) tested. The extent of decomposition during one year at room temperature observed in the presence of any of the anion exchangers did not exceed 4% even when used with the most unstable lot of sodium acetylsalicylate. This stability is entirely acceptable for practical purposes.

Similar results were obtained with aspirin itself and various compounds containing the aspirin molecule. It should be mentioned that aspirin itself is generally stable enough for all practical applications and usually does not require a stabilizer. However, it has been noted that occasional lots of aspirin develop an odor of acetic acid on standing indicating a certain amount of decomposition. While usually this decomposition is of a very minor nature, it is difficult to obtain customer acceptance of a product that is not completely odorless. Samples of aspirin containing anion exchange products have invariably remained completely odorless on standing for over twelve months at room temperature.

Similarly, aspirin compounds and complexes, such as calcium acetylsalicylate, magnesium acetylsalicylate, the calcium acetylsalicylate-urea complex, the calcium acetylsalicylate-glycine complex, the calcium acetylsalicylate dimethylsulfoxide complex and others, although inherently much more stable than sodium aspirin, showed considerable enhanced stability after the incorporation of anionic exchangers therein.

It should be mentioned that chemical decomposition is not the only type of decomposition that occurs during storage of such salts, derivatives and complexes of aspirin. Highly objectionable physical changes also take place with aspirin salts, derivatives and complexes whereby the original dry, crystalline, free flowing product becomes gummy, semi-liquid or cakes. Such physical changes make the product entirely unsuitable for commercial uses even if the chemical decomposition could be tolerated. The addition of anion exchange materials to aspirin products is also effective in preventing such physical deterioration. Sodium, calcium and magnesium acetylsalicylates, calcium acetylsalicylate complexes with glycine, urea, dimethylsulfoxide and the like, when compounded with 5-10% anion exchangers remain in dry, crystalline, free flowing condition for over twelve months and apparently will remain so for much longer periods.

Be it remembered that while this invention has been described in connection with specific details and specific embodiments thereof, these details and embodiments are illustrative only and are not to be considered limitations on the spirit and scope of said invention except insofar as these may be incorporated in the appended claims.

I claim:

1. The composition of matter comprising a mixture of an acetylsalicylic acid derivative selected from the group consisting of sodium acetylsalicylate, calcium acetylsalicylate and magnesium acetylsalicylate with 2 to 15% by weight of an anionic exchange material.

2. The comopsition of claim 1 in which the acetylsalicylic acid derivative is sodium acetylsalicylate.

3. The composition of claim 1 in which the acetylsalicylic acid derivative is calcium acetylsalicylate.

4. The composition of claim 1 in which the acetylsalicylic acid derivative is magnesium acetylsalicylate.

References Cited

FOREIGN PATENTS

| 857,193 | 12/1960 | Great Britain | 260—480 |
| 857,194 | 12/1960 | Great Britain | 260—480 |
| 885,087 | 12/1961 | Great Britain | 260—480 |

OTHER REFERENCES

Faust Dissertation Abstracts, vol. 27B(8), p. 2760 (1967).

Edwards et al., Chem. Abstracts, vol. 67 (1967), p. 11343.

JAMES A. PATTEN, Primary Examiner

V. GARNER, Assistant Examiner

U.S. Cl. X.R.

424—311